United States Patent [19]

Fowler

[11] Patent Number: 4,631,711
[45] Date of Patent: Dec. 23, 1986

[54] SYSTEM FOR REMOVABLY HOUSING AND ALIGNING COMPONENTS IN A TOWED ARRAY

[75] Inventor: John T. Fowler, Marblehead, Mass.

[73] Assignee: The Laitram Corporation, New Orleans, La.

[21] Appl. No.: 444,073

[22] Filed: Nov. 24, 1982

[51] Int. Cl.$^4$ .......................... G01V 1/38; H04R 1/44
[52] U.S. Cl. ...................................... 367/149; 367/15; 181/112; 29/602 A; 29/594
[58] Field of Search ............ 339/75 M, 147 R, 147 P; 181/110, 112, 122; 114/249, 253; 29/602 A, 594; 367/15, 149, 154, 177, 178

[56] References Cited

U.S. PATENT DOCUMENTS

| 2,444,843 | 7/1948 | Modrey | 339/75 M |
| 2,551,417 | 5/1951 | Carlisle | 367/154 |
| 2,568,851 | 9/1951 | Flude | 367/137 |
| 2,729,300 | 1/1956 | Paslay et al. | 181/110 |
| 3,713,085 | 1/1973 | Laurent et al. | 367/154 |
| 3,921,755 | 11/1975 | Thigpen | 181/112 |
| 3,939,464 | 2/1976 | Swenson | 367/154 |
| 4,295,212 | 10/1981 | Swenson | 367/154 |
| 4,508,405 | 4/1985 | Dammon et al. | 339/75 MP |

FOREIGN PATENT DOCUMENTS

| 0648248 | 9/1962 | Canada | 367/154 |
| 2220650 | 3/1973 | Fed. Rep. of Germany | 367/154 |
| 2437076 | 5/1980 | France | 339/147 R |
| 1475170 | 6/1977 | United Kingdom | 339/147 P |

OTHER PUBLICATIONS

Swenson et al., "A New Technology . . . in the Ocean", 9/12/75, pp. 1-10, ntis AD-A016-816, Naval Underwater, Systems Center.

Primary Examiner—Nelson Moskowitz
Attorney, Agent, or Firm—Weingarten, Schurgin, Gagnebin & Hayes

[57] ABSTRACT

A cartridge carrying electronic or other components is removably mounted in the breech of an adaptor module connected either in a streamer section or between opposing ends of adjacent streamer sections of a towed array. The adapter module is provided with channels for loosely guiding all but one strain member, one strain member being clamped to the module, with the longitudinal axis of the module breech being established by the longitudinal axis of the clamped strain member such that alignment of the cartridge is uniquely keyed to the single clamped strain member, the loose mounting of the unclamped strain members preventing differential forces being applied to the adapter module. In one embodiment, a spring-loaded pin and shuttle connector arrangement severs connection for an empty breech and provides for both point contact to an inserted cartridge and relatively long leakage paths so that any entrained sea water will not short out the adapter module or connector system.

41 Claims, 8 Drawing Figures

SYSTEM FOR REMOVABLY HOUSING AND ALIGNING COMPONENTS IN A TOWED ARRAY

FIELD OF INVENTION

This invention relates to towed arrays and more particularly to a system for removably housing and aligning electronic components and other devices including heading sensors, depth sensors, and streamer leveling control electronics.

BACKGROUND OF THE INVENTION

For present seismic streamer positioning applications, depth, heading, and hence position of an individual section of seismic streamer cable is determined and controlled either through the utilization of internally-mounted sensors or externally-mounted pods which are clamped onto the seismic streamer at various locations, with the electronics being hard wired or in the case of pods being battery operated and inductively coupled through the streamer casing to cables within the streamer. Examples of the pod type systems include U.S. Pat. Nos. 3,931,608; 3,611,975; 3,704,681; 3,673,556; 3,648,642; and 3,531,761.

The mounting of sensing devices wholly within the streamer has the advantage that the electronics are contained wholly within the streamer free from damage. Examples of these types of systems include those described in U.S. Pat. Nos. 4,160,229 and 3,909,774. However, one particularly severe drawback of internally housing the electronics is that for calibration purposes, it may be necessary to remove a particular streamer section from the array. This means that both electrical and mechanical connections must be severed between the streamer sections, the section opened up, and the unit calibrated. Thus, locating compasses or depth sensors within the streamer has a decided disadvantage that if a unit is malfunctioning, shorted or broken, it is extremely hard to remove it from the streamer. Moreover, as discussed in U.S. Pat. No. 4,160,229, sensors are, in essence, clamped within the cable to two or more strain members. This produces differential strains which cause canting of the sensor housing due to slightly different lengths of strain members. This causes errors because the sensor is not aligned with the longitudinal axis of the streamer.

It will be appreciated that in the usual seismic streamer application, it is usual to electrically wire compasses or heading sensor behind each other either in a daisy chain series connection, behind each other in parallel, or individual wires are run to each unit. In the usual application there are, for instance, ten heading sensing sections in a three kilometer streamer, with one heading sensor every 300 meters. Assuming that a streamer section is 50 meters long, one compass is provided for every six sections.

By way of further background, it should be noted that in most streamer applications, many compasses are used to determine the positions of the streamer segments. One type system utilizing a plurality of magnetic compasses is described in U.S. Pat. No. 4,231,111.

With respect to calibration of the compasses carried internal to the streamer, it is a common practice to string streamers with internal compasses behind the boat with, for instance, ten compass sections in a row, and the remaining portion of the streamer, including the acoustic sections, streaming out beyond the compass sections. The ship then tows the streamer on several headings and recordings are made of the outputs of the various heading sensors or compasses, with heading sensors compensated by comparing their outputs. Here, the assumption is that the compasses are all in a straight line and should have the same reading as an output. If the readings are different, this difference is stored in the processing equipment carried aboard the ship and the output of the particular unit is corrected accordingly. This, of course, is a time consuming process.

After calibration, the units are dispersed down the length of the streamer which is again a relatively time consuming process. Moreover, the distribution of the heading sensors down the streamer asumes that variations have not taken place during remounting.

It will be appreciated that clamped-on pods have a calibration advantage in that instead of taking apart the sections, the pods are moved to the front of the array and behind the ship for calibration. However, the use of externally-mounted pods has some very severe problems. First, the pod has to be removed if the cable is reeled in. Since this is accomplished often under not the best of sea states, it is an essentially risky job and external pods are often dropped overboard. The second problem is that the electronics within the pod are battery-operated, necessitating periodic replacement of the batteries or at least recharging of the batteries. A third problem is that the use of the pod necessitates an inductive coupling system to transmit information from the externally-mounted unit back to the detectors or coils contained within the streamer. This presents reliability problems for the high speed data links which are utilized. The fourth problem, and a very severe one, is that the externally-mounted units generate acoustic noise since they are outside the streamer. Since they pose an impediment to the flow of water, they generate a certain amount of turbulence and bubbling such that with a large number of externally-mounted units, non-laminar flow conditions exist which, in some instances, can blanket the acoustic devices. A fifth reason that the pods are not exceptionally useful is that they are easily knocked off. For flotsam and jetsam such as a log in the water or the presence of a mooring cable, it will be appreciated that when the streamer slides by, the pods can be caught and knocked off which presents a severe cost problem.

A sixth and extremely important problem is that the pods are mounted of necessity to the skin of the streamer cable at one or two points. As is usual, the skin is not concentric with the axis of the streamer defined by the internally-carried strain members. The strain members are the most reliable indicator of the longitudinal axis of the streamer and are mounted through so-called "donuts" which are located just beneath the skin. Thus, the axis of a pod clamped to the skin does not necessarily correspond to the longitudinal axis of the streamer as defined by the strain members.

A seventh problem is the possibility that there are hydrodynamic instabilities in which the pod may cant or rack on its supports, thereby causing a misalignment between its axis and the axis of the strain members of the streamer. The externally-mounted pod, when canted, strums or jitters back and forth with respect to the axis of the streamer so that the heading readout from a pod-mounted compass is not a good indication of the heading of the streamer at the measuring point. The ability to determine heading accurately is of paramount importance in determining the accuracy of a survey.

An additional problem with respect to the externally-mounted pods is that while during calibration the mounts may accurately reflect the longitudinal axis of the streamer at one position immediately behind the boat, attaching the mounts at other positions along other streamers may result in a canting by as much as 1″. While the clamping system can result in canting during calibration, it can also result in further canting when the pod is remounted down the streamer.

A subsidiary problem with the use of the externally-mounted pods is that the provision of any protuberances on a streamer does not lend itself easily to the streamer going through the shives or fair-leads and over the drum utilized for paying out the streamer.

SUMMARY OF THE INVENTION

In order to provide for easy calibration of compasses utilized in seismic streamers, and in order to take advantage of the subminiaturization of the electronic components which are now available, in the subject system, a breech-loaded adapter module is connected either in a streamer section between adjacent streamer segments or between opposing ends of seismic streamer sections, with a cartridge carrying the electronics, sensors, and/or other components being mounted in the breech of the adapter module, and aligned by the side walls of the breech to the longitudinal axis of the module. The module is in turn aligned to the longitudinal axis represented by one of the strain members running through and carried by the module by clamping the module to this strain member. Other strain members are loosely carried in and run through the adapter module. The result is that alignment of the sensor within the cartridge is keyed to and uniquely determined by one and only one of the strain members. As mentioned hereinbefore, were the housing clamped to two or more strain members, differential forces produced by the clamped strain members would contort the adapter module housing, thereby causing a misalignment between the longitudinal axis of the cartridge and the strain members. The cartridge is configured such that when it is mounted in the breech, its outer surface is flush with the other surface of the adapter module which is adjacent to the cartridge. This provides a smooth cylindrical module, the diameter of which is matched to the diameter of the adjacent streamer segments or sections for an exceptionally streamlined configuration.

In one embodiment, the cartridge carries a cylindrical compass which is configured to rotate in 360° around the roll axis. The roll axis of the compass is defined by its outer housing which, when made coincident with the outer housing of the cartridge, automatically aligns the roll axis of the compass with the axis defined by the clamped strain member.

The cartridge is pressed to one end of the breech by an over-the-center lever-actuated locking mechanism. A number of connector pins are provided at the end of the breech to which the cartridge is moved by the lever-actuated locking mechanism. In one embodiment, a connector is provided at this end of the breech in which double-ended, spring-loaded, insulated pins are carried in a shuttle which is biased away from the end of the adapter module housing. When the breech is not loaded, i.e. when there is no cartridge located in the breech, the shuttle carrying the double-ended, pointed, spring-biased pins is moved away from connector contacts at the end of the adapter module housing. This prevents shorting of the internal connector contacts. In short, the reciprocating shuttle is spring-biased away from the connector contacts and insures an open connection between the contacts for an unloaded breech.

The ends of the spring-loaded, pointed pins opposite the ends which communicate with the aforementioned contacts are adapted to slidingly fit into cylindrical channels at the nose of the cartridge. Cartridge contacts are situated at the interior ends of the channels. When the cartridge is forced into the breech by the aforementioned lever action, the insulated pins force any sea water out of the cylindrical channels in the nose of the cartridge, thereby to prevent any sea water shorting of the cartridge contacts.

While the shuttle is gasketed to prevent the infusion of sea water, should a gasket be missing and sea water is admitted between the shuttle and the cartridge, the current leakage path length is made exceedingly long by virtue of the insulation surrounding the pins inserted into the cartridge nose channels such that sea water does not short out either the cartridge or the electrical cables for the streamer.

In summary, either the sea water is forced out of the adapter module by virtue of the connection system or the connection system provides an extremely long shorting path such that current leakage between contact pins is minimized. Moreover, due to the utilization of a reciprocating shuttle within the connector portion of the adapter module, a cartidgeless module is disconnected from the main electrical cable or transmission line.

The advantages of the adapter module are first that with the cartridge flush with the outer casing of the module, no flow anomalies are introduced, such as the flow anomalies introduced by the aforementioned pods. Secondly, the easy removability of the cartridge permits access to a damaged, broken or malfunctioning electrical or other unit without either invasion of a sealed streamer section or the removal of a pod.

Most importantly, the breech of the adapter module being clamped to one of the strain members creates alignment between the inserted cartridge and the strain member, thereby affording alignment accuracies not hitherto possible. The individual cartridges may be aligned and compensated at the factory, with the cartridge/breech combination precluding the necessity of realignment due to the close tolerances of the cartridge outer casing and the breech inner walls.

Since the adapter module exterior housing is flush with the streamer casings, the adapter modules may be included in the streamer when it is wound on the payout drum. The adapter modules easily pass through shives or fair-leads and may be paid out from the drum without careful attention, such that the payout of the streamer may be completely unattended insofar as the electronics is concerned. Moreover, because the cartridges are easily mounted in the modules, the streamer may be deployed with minimum hazard to those deploying the streamer.

The connection system is fail-safe in that unloaded breeches result in a completely open connection between the particular adapter module and the transmission line within the streamer.

While the subject system will be described in connection with a two-wire parallel-connected assemblage of adapter units, it will be appreciated that inductive coupling may be utilized between the cartridge and the adapter module. Moreover, any convenient system of multiplexed or non-multiplexed, analog or digital readout can be used within the adapter module and cartridge.

Flow anomalies introduced by the electronics are completely eliminated whereby not only is alignment accuracy increased by the subject system, but also accuracy of collected data is increased. The adaptability of the adapter module to many types of sensors and heading indicators provides a universally adaptable system for the inclusion in a seismic streamer of a wide variety of miniaturized electronic packages.

In short, an overall system is provided in which small electronic or other packages including small heading sensors, small depth sensors, small level control units, etc., are faired into the streamer in a streamlined, smooth, and readily accessible configuration, thereby simplifying calibration and maintenance.

It should be noted that with respect to miniaturization, depth sensors and heading sensors can now be made to a maximum of one inch in diameter, thereby permitting their mounting in a suitably small cartridge. The cartridge system provides a rigid short streamer section which is guaranteed to be parallel to one of the three strain members, thereby providing, at least for compasses, that the compass roll axis is perfectly parallel to the axis of the streamer. It should be noted that the housing as configured, allows strain members of non-magnetic material to be run through the housing. The system provides for precompensation since an identical housing and strain member can be fixtured at the factory and a cartridge introduced into the breech of the adapter module at the factory for compensation purposes. Since both adapter modules and their strain members are identical, inserting a calibrated cartridge in the field does not alter the prealignment. calibration. Finally, the adapter modules may then be placed in the active acoustic sections while still providing accessability for calibration and repair. This has the advantage of not breaking the spacing of acoustic arrays of hydrophones, resulting in a mathematically simpler model.

BRIEF DESCRIPTION OF THE DRAWINGS

These and other features of the subject invention will be better understood in connection with the detailed description taken in conjunction with the drawings of which.

DETAILED DESCRIPTION

Figure 1:
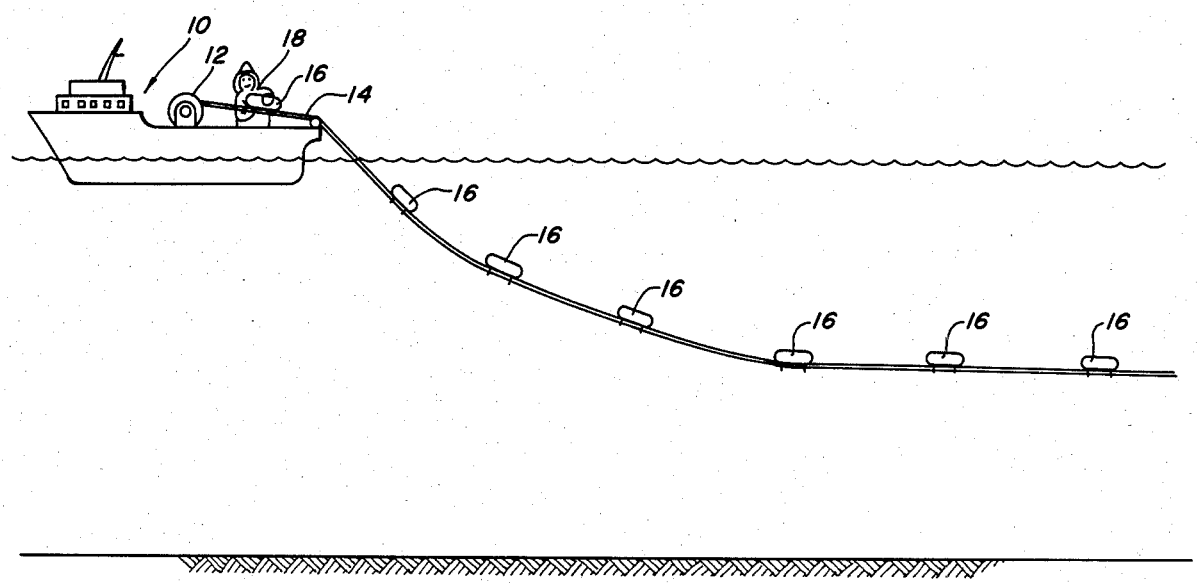
FIG. 1 is a diagrammatic representation of a prior art system for providing externally-mounted pods during the deployment of a streamer.

Referring now to FIG. 1, in the prior art a vessel 10 is provided with a payout reel or spool 12 on which is wound a segmented streamer 14 to which is attached externally-mounted pods 16. The pods are mounted by an individual 18 on the afterdeck of the vessel, with the pods generally carrying electronic components including depth sensors, compasses, and level control units for maneuvering the veins (not shown) attached to the pods. Not only are the pods difficult to mount in a rough sea state, their presence along streamer 14 presents flow anomalies in the form of turbulence which can affect the readings of the various components carried in the pods. The externally-mounted pods are easily damaged when the streamer runs by floating logs or mooring cables and are difficult to align properly with the longitudinal axis of the streamer. As mentioned hereinbefore, calibration includes mounting the pods close to the vessel initially, and then deploying the compensated pods along the length of the streamer after calibration. Assuming initial calibration is possible, deploying the pods at other locations along other portions of the streamer can, as mentioned hereinbefore, alter the calibration of the electronic components, especially with respect to the alignment of these components with the longitudinal axis of the streamer.

Moreover, because the pods are not faired into the streamer itself, the pods may strum or vibrate when the streamer is towed. The strumming or vibration can materially affect the reading of the sensors or other electronic components in a pod and can cause the malfunctioning of the components due to vibration and vibration-caused damage. In general, the pods are battery-operated, necessitating removal, at least for recharing of the batteries, or for the placement of new batteries within a pod.

To summarize, the utilization of externally clamped-on pods is inconvenient. Maintenance is difficult and alignment problems can result in false data being transmitted to the ship-board electronics. Loss of the pods due to mishandling under rough sea states, as well as snagging during towing, presents problems in terms of the cost of the lost pods.

Figure 2:
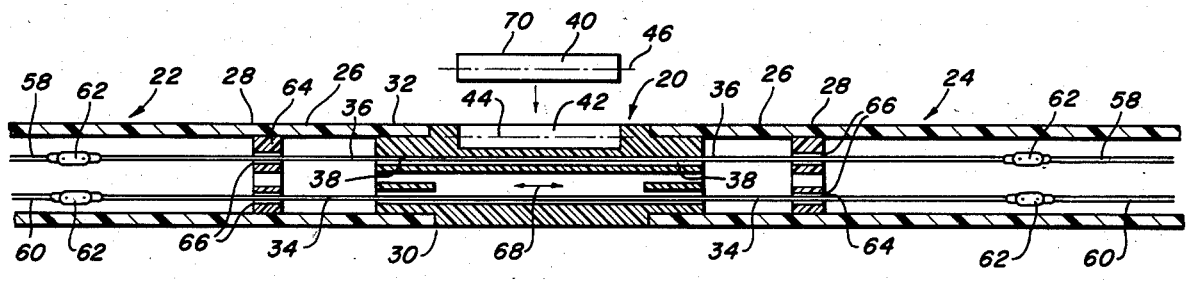
FIG. 2 is a diagrammatic and cross-sectional view of the subject adapter module connected between two abutting streamer section segments, illustrating the alignment of an inserted cartridge with the longitudinal axis of a single clamped strain member carried in the adapter module.

In order to provide a systm which eliminates the problem of the externallymounted pods and also the problems associated with electronics mounted internal to a streamer section, and referring now to FIG. 2, an adapter module 20 is connected within an active streamer section between streamer segments 22 and 24 by virtue of the clamping of the adapter module to the skin 26. The adapter module is provided with interior channels 30 and 32 which house strain members 34 and 36. Strain member 34 is loosely carried within module 20, whereas strain member 36 is clamped fore and aft along the length thereof to adapter module 20 by virtue of set screws 38. The strain members passing through the adapter module are made of non-magnetic material such as type 305 stainless steel so as not to affect any magnetic measurements made by the electronics in a cartridge diagrammatically illustrated at 40, which is inserted into a breech 42. The longitudinal axis 44 of the breech is made parallel to the longitudinal axis of strain member 36 due to the clamping of this stain member to the module in channel 32. Breech 42 has side walls which are parallel to the longitudinal axis such that when cartridge 40 is mounted in breech 42, the longitudinal axis 46 of cartridge 40 is maintained parallel to the longitudinal axis of strain member 36.

The strain members carried by the module are conneted to corresponding strain members 58 and 60 carried by the streamer section. These latter strain members may be made of magnetic material such as plow steel. The connection of strain members 34 and 36 to strain members 58 and 60, respectively, may be accomplished by virtue of a swaged joint 62 as illustrated.

The strain members are retained in their respective positions by a donut 64 at the abutting ends of streamer segmets 22 and 24. As is usual, two of the three strain members running through orifices 66 in donut 64, may move relative to the donut and are not, in general, secured to the donut. The result is that two of the three strain members in the adapter module, as well as the strain members in a streamer section, may move one relative to the other. Note that if module 20 were clamped to all strain members, with differential movement, the module could contort thereby destroying the longitudinal axis represented by any one of the strain members. The relative movement of one strain member with respect to the other is illustrated by double-ended arrow 68.

In summary, what is described in connection with FIG. 2 is a modularized system for providing that miniaturized electronics housed in cartridge 40 can be faired into a streamer, easily and conveniently, with the alignment of the cartridge being assured by virtue of the clamping of the module to one and only one strain member passing therethrough. The top surface 70 of the cartridge, when mounted in breech 42, is flush with the outer portions of the streamer sections such that the introduction of electronic components to the streamer does not produce flow anomalies. The faired configuration facilitates payout of the streamer assembly from a payout reel through fair-leads and shives and provides a system for the easy mounting of a cartridge within the streamer assembly.

Figure 5:
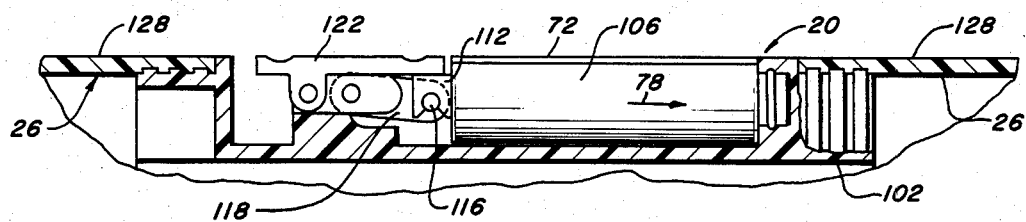
FIG. 5 is a cross-sectional and diagrammatic view of a portion of the adapter module of FIG. 4, illustrating a completely inserted cartridge.
Figure 6:
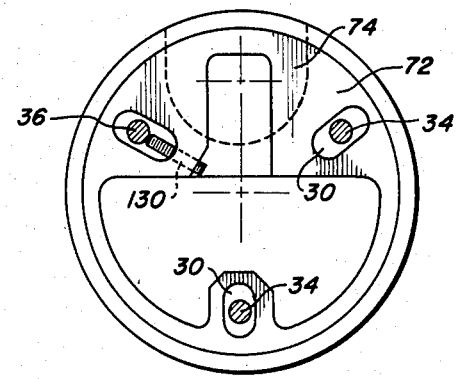
FIG. 6 is a cross-sectional view of the adapter module of FIG. 4, illustrating the clamping of the adapter module to one and only one strain member running therethrough.

Since the adapter modules are identical, electronics within a cartridge can be precalibrated at a factory which utilizes the identical module such that alignment and calibration errors associated with the electronic components can be compensated for at the factory. This permits a precompensated cartridge to be assembled into the composite streamer as the streamer is rolled up on the payout reel. Alternatively, the cartridge can be placed in the breech of an adapter module as the streamer is paid out from the payout reel. A simplified locking and insertion system is described in detail in connection with FIGS. 3, 4, and 5, with the connection of the electronics in the cartridge to a connector carried by the module being described in connection with FIGS. 7 and 8. FIG. 6 is a detailed drawing describing the clamping of the module to one and only one internally-carried strain member.

Figure 3:
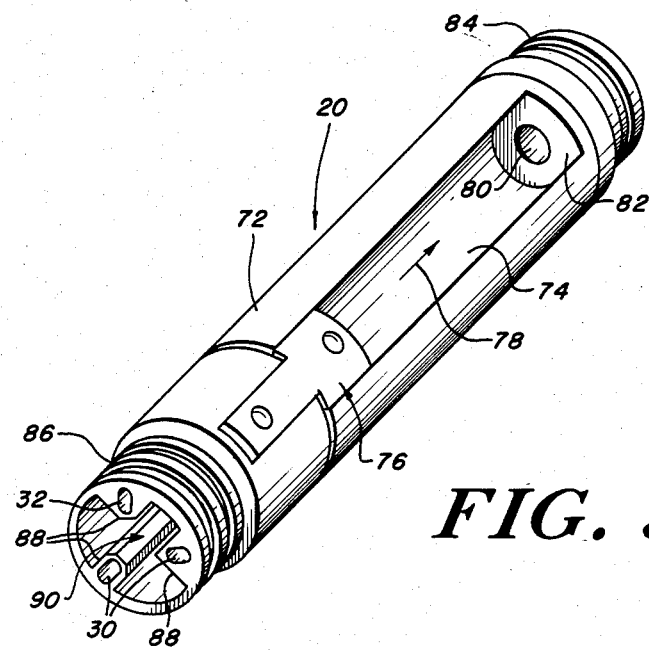
FIG. 3 is an isometric view of one embodiment of the adapter module of FIG. 2.

Referring now to FIG. 3, in one embodiment adapter module 20 includes a cylindrical housing 72 into which is formed a U-shaped breech 74. A locking mechanism 76, which is both lever-actuated and an over-the-center device, is provided for the movement of a cartridge (not shown in this figure) in the direction of arrow 78 such that an end of the cartridge is pressed into a cylindrical orifice 80 in an end wall 82 of housing 72.

Housing 72 is provided with ribbed reduced-diameter sections 84 and 86 which are adapted to be slipped into skin 26 of FIG. 2. Channels 30 and 32 are provided longitudinally through housing 72 in protruding rib portions 88 of housing 72. Housing 72 is provided with a longitudinally running interior channel 90 adapted to accommodate electrical cables shown in connection with FIG. 4.

Figure 4:
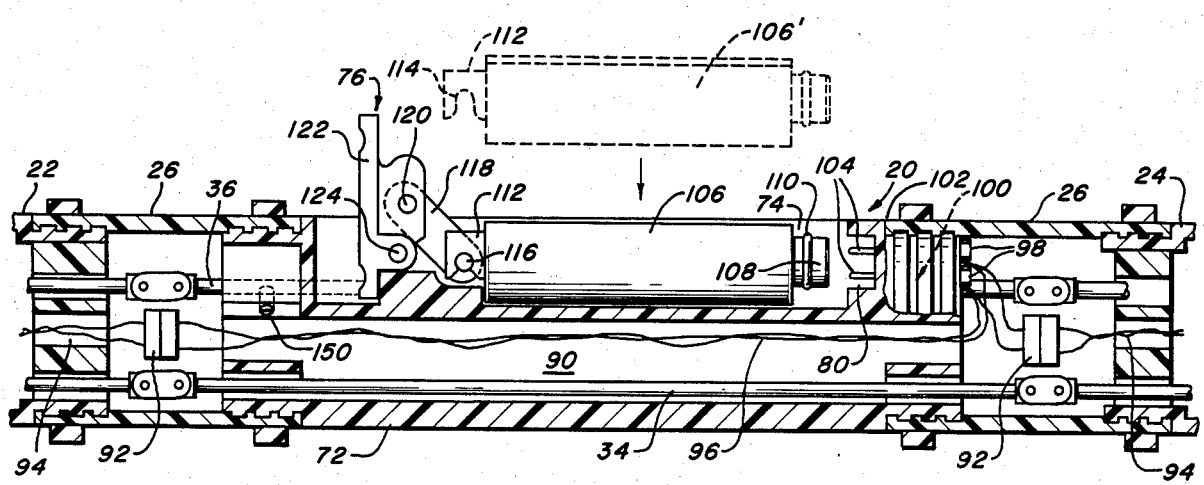
FIG. 4 is a cross-sectional and diagrammatic illustration of one embodiment of the adapter module of FIG. 2, illustrating the breech loading of a cartridge.

Referring now to FIG. 4, module 20 is shown connected at either end by electrical connectors 92 to a two-wire cable 94 running through abutting streamer sections 22 and 24. A two-wire cable 96 is provided through channel 90 and is connected at connector terminals 98 to a connector 100 housed at end 102 of module 20. Connector pins 104 extend into breech 74 such that when a cartridge 106 is moved by locking mechanism 76, connector pins 104 are inserted into nose 108 of cartridge 106. Nose 108 carries an annular sealing grommet or ring 110 such that when the nose is inserted into cylindrical orifice 80, grommet 110 seals the connector portion of the module to prevent the infusion of sea water.

Prior to insertion, as illustrated at 106', the cartridge in a preferred embodiment includes an aft tab 112 with a notch 114 therein. When inserted into the breech, notch 114 communicates with a pin 116 carried by a linkage 118 pivotedly anchored at 120 to a lever 122, pivotedly attached to housing 72 by pin 124. When lever 122 is actuated as illustrated in FIG. 5, linkage 118 moves cartridge 106 in the direction of arrow 78 to lock the cartridge into the module. This over-the-center lever actuation presses the cartridge into the breech towards connector end 102, with the breech and cartridge being so configured that top surface 72 of the cartridge is flush with surfaces 128 of cylindrical sleeves 26.

Referring to FIG. 6, strain member 36 is clamped to housing 72 via set screw 130, with set screws being provided in either end of housing 72. As can be seen, strain members 34 are loosely carried in channels 30 provided in housing 72. The position of breech 74 is shown in dotted outline to be U-shaped in cross-section.

Figure 7:
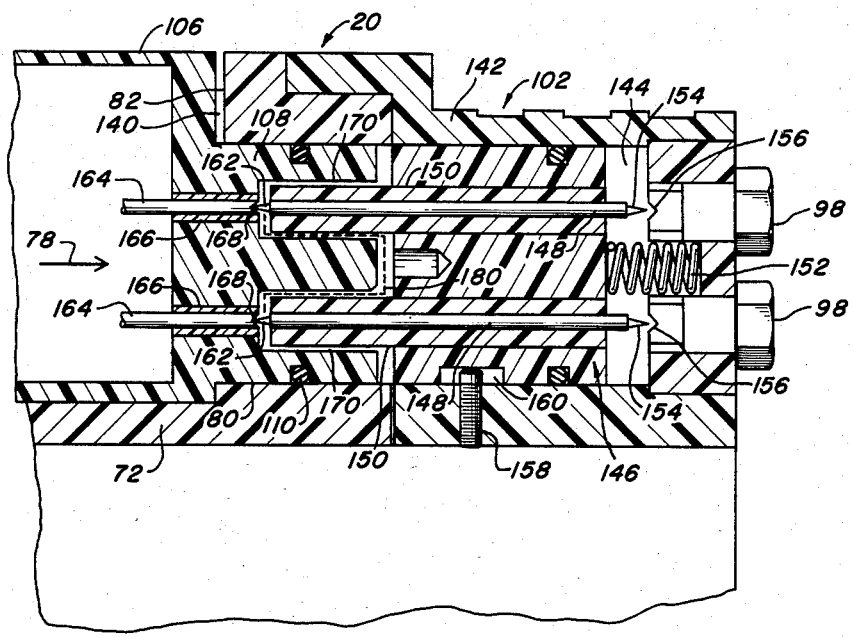
FIG. 7 is a cross-sectional and diagrammatic view of the connector portion of the adapter module of FIG. 4, illustrating a shuttle-carried, pointed, spring-biased connector pin assembly.

Referring now to FIG. 7, connector end 102 of module 20 is illustrated, with nose 108 of cartridge 106 being partially inserted into cylindrical channel 80. Here, an abutting end 104 of cartridge 106 is shown slightly spaced from wall 82 of module 20.

Connector end 102 includes a connector body 142 which is coupled to housing 72 by a pressfitting or other operation. Connector body 142 includes an interior channel 144 into which is slidingly disposed a shuttle 146 which carries spring-loaded pins 148 in electrically insulating sleeves 150. The shuttle/pin combination is spring-biased by spring member 152 away from connector terminals 98 such that pin ends 154 of pins 150 are biased away from conical cups 156 carried by terminals 98. The pins are adapted to cooperate with pointed pin ends 154 to establish electrical contact between the connectors and the pins. A set screw 158 is provided through housing 72 and into a slot 160 in shuttle 146 to limit the movement of the shuttle produced by spring member 152.

Pointed pin ends 162 are adapted to communicate with conductors 164 carried by cartridge 106 in insulated sleeves 166. The ends of conductors 164 contain conical cups 168 which are adapted to receive pin ends 162. Nose 108 is provided with channels 170 adapted to admit sleeves 150 therein in a tight fit.

In operation, when cartridge 106 is moved in the direction of arrow 78, pin ends 162 and their respective sleeves 150 are inserted into channels 170 until such time as the pin ends coact with cups 168 of conductors 164. Further movement of cartridge 106 pushes shuttle 146 in the direction of arrow 78 until such time as pin ends 154 contact cups 156. In one embodiment as illustrated in FIG. 8, pin ends are spring-biased such that a positive electrical connection is made between conductors 164 and terminals 98 in a spring-biased arrangment which is maintained by the locking of cartridge 106 into the associated breech.

Should "O" ring 110 be removed or should any sea water be admitted into the space between cartridge nose 108 and shuttle 146, a relatively long conductive path 180 precludes the shorting out of the pins or the conductors in the assemblage. With the exception of the pins, all elements of the adapter module are made of electrically non-conducting material. With a cartridgeless breech, shuttle 146 is moved in a direction opposite to that of arrow 78 by spring member 152, thereby completely disconnecting the adapter module from the aforementioned electrical cable.

Figure 8:
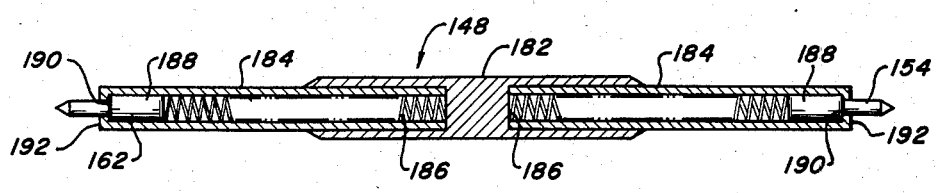
FIG. 8 is a cross-sectional and diagrammatic view of one embodiment of the pointed spring-biased connector assembly for use in the connector of FIG. 7.

Referring now to FIG. 8, spring-loaded pin assembly 148 may include an electrically conductive central body 182, with conductive sleeves 184 pressfit thereto. Spring members 186 are contained in sleeves 184, with pin ends 162 and 154 being fitted into the ends of sleeves 184 as illustrated. Pin ends 162 and 154 are provided with enlarged cylindrical bodies 188 having surfaces 190 which abut inwardly projecting lips 192 to prevent their escape.

It is understood that the adapter module may be incorporated as an end cap at one end of an active section, or may employ a fill plug, quick disconnect connector terminations, or other ancillary apparatus, so long as the proper nonmagnetic environment is maintained.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. In combination:
   a streamer section;
   an adapter module coupled to at least one portion of said section and having an exterior surface faired with the exterior surface of said streamer section, said module having a breech and at least one strain member channel running therethrough;
   at least one strain member in said strain member channel and means for clamping said strain member in said channel to said module;
   a cartridge adapted to be removably mounted in said breech, said cartridge having a surface which is faired to the exterior surface of said module adjacent said breech when said cartridge is mounted in said breech; and
   means for removably locking said cartridge in said breech.

2. The combination of claim 1 wherein the longitudinal axis of said channel is parallel to the longitudinal axis of said breech, wherein the walls of said breech are parallel to the longitudinal axis of said breech, wherein at least a portion of the wall of said cartridge contacts the adjacent wall of said breech when said cartridge is mounted in said breech, said portion of the wall of said cartridge being parallel to the longitudinal axis of said cartridge, said clamped strain member establishing the longitudinal axis of said cartridge.

3. The combination of claim 2 wherein said module includes additional strain member channels and additional strain members, each running through a different one of said additional channels, said additional strain members being carried in associated channels in a loose fit.

4. The combination of claim 1 wherein said locking means includes over-the-center lever-actuated means including a lever pivoted to said module for moving said cartridge in said breech.

5. The combination of claim 4 wherein said cartridge includes an aft tab having a slot therein and wherein said locking means includes means coacting with said slot for moving said cartridge in two directions responsive to the movement of said lever in different directions.

6. The combination of claim 5 wherein said over-the-center lever-actuated means includes linkage means having a pin at one end adapted to coact with said slot pivotally, said linkage being attached to said lever at the other end thereof.

7. The combination of claim 1 wherein said module includes a module-carried electrical connector having a housing mounted at one end of said breech, and wherein said cartridge includes a cartridge-carried electrical connector adapted to mate with said module-carried electrical connector when said cartridge is mounted in said breech.

8. The combination of claim 7 wherein said module-carried electrical connector includes a spring-biased shuttle mounted for reciprocation within said module-carried connector housing such that the mounting of a cartridge in said breech results in the movement of said shuttle against its spring biasing to the end of said module-carried connector away from said breech, said shuttle including at least one spring-loaded electrically conductive pin assembly running longitudinally therethrough, said pin assembly including a first pin projecting from one end of said shuttle away from said breech.

9. The combination of claim 8 wherein said module includes an electrical cable therethrough and wherein said module-carried connector includes a connector terminal at the end thereof away from said breech, said terminal being connected to said cable, said first pin adapted to contact said terminal when said shuttle is moved towards said terminal responsive to the mounting of said cartridge in said breech, said spring-biased shuttle moving said first pin away from said terminal for a cartridgeless breech, thereby to disconnect said module for a cartridgeless breech.

10. The combination of claim 9 wherein said pin assembly includes a second pin electrically connected to said first pin and projecting towards said breech, said cartridge including a nose having a channel therein opened at one end to receive said second pin, said channel having an electrical contact at the closed end thereof adapted to coact with an inserted second pin.

11. The combination of claim 10 wherein said pin assembly includes a cylindrical housing and wherein said pins are mounted at either end of said cylindrical housing, said cylindrical housing including means for spring biasing said pins outwardly and detent means for preventing the escape of said pins from said cylindrical housing.

12. The combination of claim 11 wherein said shuttle is electrically nonconductive and wherein said cylindrical housing and pins are electrically conductive.

13. The combination of claim 10 wherein said shuttle is electrically nonconductive and includes at least two electrically conductive pin assemblies, wherein said nose is electrically non-conductive and has at least two of said channels, wherein the pins adapted to project into said channels include insulating sleeves from said shuttle to said pin ends, whereby a shorting path from one pin end to the other pin end is elongated due to the electrically non-conductive nose and sleeves.

14. The combination of claim 13 wherein said sleeves form a water-tight seal with associated channels when said pins are inserted in said channels.

15. Apparatus adapted to be connected to a streamer section comprising:
an adapter module having an exterior surface faired with the exterior surface of said streamer section, said module having a breech for receiving a cartridge adapted to be removably mounted in said breech and at least one strain member channel running therethrough, at least one strain member in said strain member channel and means for clamping said strain member in said channel to said module, said cartridge having a surface which is faired to the exterior surface of said module adjacent said breech when said cartridge is mounted in said breech, and means for removably locking said cartridge in said breech.

16. The apparatus of claim 15 wherein the longitudinal axis of said channel is parallel to the longitudinal axis of said breech, wherein the walls of said breech are parallel to the longitudinal axis of said breech, wherein at least a portion of the wall of said cartridge contacts the adjacent wall of said breech when said cartridge is mounted in said breech, said portion of the wall of said cartridge being parallel to the longitudinal axis of said cartridge, said clamped strain member establishing the longitudinal axis of said cartridge.

17. The apparatus of claim 16 wherein said module includes additional strain member channels and additional strain members, each running through a different one of said additional channels, said additional strain members being carried in associated channels in a loose fit.

18. The apparatus of claim 15 wherein said locking means includes over-the-center lever-actuated means including a lever pivoted to said module for moving said cartridge in said breech.

19. The apparatus of claim 18 wherein said cartridge includes an aft tab having a slot therein and wherein said locking means includes means coacting with said slot for moving said cartridge in two directions responsive to the movement of said lever in different directions.

20. The apparatus of claim 19 wherein said over-the-center lever-actuated means includes linkage means having a pin at one end adapted to coact with said slot pivotally, said linkage being attached to said lever at the other end thereof.

21. The apparatus of claim 15 wherein said module includes a module-carried electrical connector having a housing mounted at one end of said breech, and wherein said cartridge includes a cartridge-carried electrical connector adapted to mate with said module-carried electrical connector when said cartridge is mounted in said breech.

22. The apparatus of claim 21 wherein said module-carried electrical connector includes a spring-biased shuttle mounted for reciprocation within said module-carried connector housing such that the mounting of a cartridge in said breech results in the movement of said shuttle against its spring biasing to the end of said module-carried connector away from said breech, said shuttle including at least one spring-loaded electrically conductive pin assembly running longitudinally therethrough, said pin assembly including a first pin projecting from one end of said shuttle away from said breech.

23. The apparatus of claim 22 wherein said module includes an electrical cable therethrough and wherein said module-carried connector includes a connector terminal at the end thereof away from said breech, said terminal being connected to said cable, said first pin adapted to contact said terminal when said shuttle is moved towards said terminal responsive to the mounting of said cartridge in said breech, said spring-biased shuttle moving said first pin away from said terminal for a cartridgeless breech, thereby to disconnect said module for a cartridgeless breech.

24. The apparatus of claim 23 wherein said pin assembly includes a second pin electrically connected to said first pin and projecting towards said breech, said cartridge including a nose having a channel therein opened at one end to receive said second pin, said channel having an electrical contact at the closed end thereof adapted to coact with an inserted second pin.

25. The apparatus of claim 24 wherein said pin assembly includes a cylindrical housing and wherein said pins are mounted at either end of said cylindrical housing, said cylindrical housing including means for spring biasing said pins outwardly and detent means for preventing the escape of said pins from said cylindrical housing.

26. The apparatus of claim 25 wherein said shuttle is electrically non-conductive and wherein said cylindrical housing and pins are electrically conductive.

27. The apparatus of claim 24 wherein said shuttle is electrically non-conductive and includes at least two electrically conductive pin assemblies, wherein said nose is electrically non-conductive and has at least two of said channels, wherein the pins adapted to project into said channels include insulating sleeves from said shuttle to said pin ends, whereby a shorting path from one pin end to the other pin end is elongated due to the electrically non-conductive nose and sleeves.

28. The apparatus of claim 27 wherein said sleeves form a water-tight seal with associated channels when said pins are inserted in said channels.

29. In combination:
a streamer section;
an adapter module coupled to at least one portion of said section, said module having a breech and at least one strain member channel running therethrough;
at least one strain member in said strain member channel and means for clamping said strain member in said channel to said module;
a cartridge adapted to be removably mounted in said breech; and
means for removably locking said cartridge in said breech.

30. The combination of claim 29 wherein the longitudinal axis of said channel is parallel to the longitudinal axis of said breech, wherein the walls of said breech are parallel to the longitudinal axis of said breech, wherein at least a portion of the wall of said cartridge contacts the adjacent wall of said breech when said cartridge is mounted in said breech, said portion of the wall of said cartridge being parallel to the longitudinal axis of said cartridge, said clamped strain member establishing the longitudinal axis of said cartridge.

31. The combination of claim 30 wherein said module includes additional strain member channels and additional strain members, each running through a different one of said additional channels, said additional strain members being carried in associated channels in a loose fit.

32. The combination of claim 29 wherein said breech is longer than said cartridge and wherein said means for removably locking said cartridge in said breech urges said cartridge towards one end of said breech.

33. The combination of claim 29 wherein one end of said breech includes an electrical connector having at least one connector terminal exposed in said breech and further including means for preventing shorting of said electrical terminal to any other electrical conductor for a cartridgeless breech.

34. The combination of claim 33 wherein said electrical connector includes a spring biased shuttle mounted for reciprocation in said breech ahead of said electrical connector, said breech having a portion extending towards said electrical connector, said shuttle being sealed to said portion and being movable towards said electrical connector upon the mounting of a cartridge in said breech such that said shuttle is moved against its spring biasing towards the end of said breech carrying said electrical connector, said shuttle including at least one electrically conductive assembly running longitudinally therethrough, said assembly including a first portion projecting from one end of said shuttle, and adapted to contact said terminal when said shuttle is moved towards said electrical contact.

35. The combination of claim 34 wherein said spring-biased shuttle moves said first assembly portion away from said terminal for a cartridgeless breech, thereby to disconnect said module for a cartridgeless breech.

36. The combination of claim 35 wherein said assembly includes a second portion electrically connected to said first portion and projecting in a direction opposite, said cartridge including a nose having a channel therein opened at one end to receive said second portion, said channel having an electrical contact adapted to coact with an inserted second portion.

37. The combination of claim 36 wherein said assembly includes a cylindrical housing and wherein said portions include pins mounted at either end of said cylindrical housing, said cylindrical housing including means for spring biasing said pin portions outwardly and detent means for preventing the escape of said pin portions from said cylindrical housing.

38. The combination of claim 37 wherein said pins are pointed.

39. The combination of claim 37 wherein said shuttle is electrically nonconductive and includes at least two electrically conductive pin assemblies, wherein said nose is electrically nonconductive and has at least two of said channels, wherein the pin portions adapted to project into said channels include insulating sleeves from said shuttle to the ends of said pin portions, whereby a shorting path from one pin end to the other pin is elongated due to the electrically nonconductive nose and sleeves.

40. The combination of claim 39 wherein said sleeve forms a water tight seal with associated cartridge nose channels once the pin ends are inserted into respective channels.

41. ApparAtus adapted to be connected to a streamer section comprising:
an adapter module having a breech for receiving a cartridge adapted to be removably mounted in said breech and at least one strain member channel running therethrough wherein the longitudinal axis of said channel is parallel to the longitudinal axis of said breech, wherein the walls of said breech are parallel to the longitudinal axis of said breech, wherein at least a portion of the wall of said cartridge contacts the adjacent wall of said breech when said cartridge is mounted in said breech, said portion of the wall of the cartridge being parallel to the longitudinal axis of said cartridge; and
at least one strain member in said strain member channel and means for clamping said strain member in said channel to said module, said clamped strain member establishing the longitudinal axis of said cartridge; and
means for removably locking said cartridge in said breech.

* * * * *

UNITED STATES PATENT AND TRADEMARK OFFICE
CERTIFICATE OF CORRECTION

PATENT NO. : 4,631,711
DATED : December 23, 1986
INVENTOR(S) : John T. Fowler

It is certified that error appears in the above-identified patent and that said Letters Patent is hereby corrected as shown below:

| | | |
|---|---|---|
| Column 2, | line 13, | "asumes" should read --assumes-- |
| Column 3, | line 7, | "1"." should read --1°.-- |
| | line 42, | "other" should read --outer-- |
| Column 4, | line 28, | "cartidgeless" should read --cartridgeless-- |
| Column 5, | line 34, | "prealignment." should read --prealignment-- |
| Column 6, | line 50, | "systm" should read --system-- |
| | line 51, | "externallymounted" should read --externally-mounted-- |
| Column 7, | line 1, | "stain member" should read --strain member-- |
| Column 9, | line 10, | "arrangment" should read --arrangement-- |
| Column 14, | line 26, | "ApparAtus" should read --Apparatus-- |

Signed and Sealed this

Twenty-first Day of June, 1988

Attest:

DONALD J. QUIGG

*Attesting Officer*      *Commissioner of Patents and Trademarks*